United States Patent [19]

Hood

[11] Patent Number: 4,830,277

[45] Date of Patent: May 16, 1989

[54] THERMOSTATIC VALVE

[75] Inventor: Douglas M. Hood, Blackstone, Mass.

[73] Assignee: Demaich Industries, Inc., Johnston, R.I.

[21] Appl. No.: 184,127

[22] Filed: Apr. 20, 1988

[51] Int. Cl.$^4$ ............................................. G05D 23/08
[52] U.S. Cl. ................................ 236/93 R; 236/48 R
[58] Field of Search ................. 236/48 R, 87, 93 R, 236/101 C, 101 R

[56] References Cited

U.S. PATENT DOCUMENTS

| | | | |
|---|---|---|---|
| 1,774,537 | 9/1930 | Zimmerman | 236/93 R |
| 1,848,031 | 3/1932 | Spencer | 236/93 R X |
| 1,972,170 | 9/1934 | Spencer | 236/93 R X |
| 2,471,655 | 5/1949 | Rundell | 236/93 R X |
| 3,790,077 | 2/1974 | Wisyanski et al. | 236/87 X |
| 3,804,326 | 4/1974 | McIntire | 236/87 X |
| 3,965,222 | 6/1976 | Benjamin | 236/87 X |

Primary Examiner—William E. Tapolcai
Attorney, Agent, or Firm—Salter & Michaelson

[57] ABSTRACT

A thermoplastic valve includes a valve body having an open cavity therein and inlet and outlet passages which communicate with the cavity, a valve seat at the inner end of the outlet passage and a bimetallic disc in the cavity. The bimetallic disc has an apereture therethrough, and it is responsive to a predetermined temperature condition for flexing between a closed position wherein the central portion of the disc is received on the valve seat so that it obstructs the outlet passage and an open position wherein the outlet passage is unobstructed and a fluid can pass outwardly from the cavity by passing through the aperture in the disc and then through the outlet passage. The disc is supported in the cavity so that the peripheral portion of the disc is spaced inwardly from the plane of the valve seat to minimize the resistance to the flow of a fluid as the fluid passes from the aperture in the disc to the outlet passage when the disc is in the open position.

5 Claims, 2 Drawing Sheets

PRIOR ART

THERMOSTATIC VALVE

BACKGROUND AND SUMMARY OF THE INVENTION

The instant invention relates to thermostatic valves, and more particularly to a thermostatic valve which is operative with increased accuracy for restricting the flow of a fluid therethrough when the valve is in an open position.

Thermostatic valves which are operative in response to predetermined temperature conditions for movement between open and closed positions have been generally known for a number of years. Further, thermostatic valves which are actuated in response to predetermined temperature conditions by temperature responsive bimetallic discs for movement between open and closed positions have been generally known for a number of years. In this regard the U.S. Pat. Nos. #1,654,519; to GREENAWALT, #1,773,698; SPENCER, #3,930,613 to PLACE, and #4,103,824, to SEIFERT, disclose exemplary thermostatic valves which are actuated by bimetallic discs.

One specific type of heretofore available thermostatic valve which has been generally found to be effective comprises a valve body having an interior cavity formed therein, inlet and outlet passages in the valve body which communicate with the cavity, a valve seat in the valve body adjacent the outlet passage, and a bimetallic disc in the cavity adjacent the valve seat. The bimetallic disc has at least one aperture formed therein which is offset from the center of the disc, and the disc is responsive to a predetermined temperature condition for movement between a first position wherein the central portion of the disc is flexed toward the valve seat so that it substantially prevents the flow of fluid through the outlet passage, and a second position wherein the central portion of the disc is flexed away from the valve seat so that fluid can pass from the cavity to the outlet passage by passing through the aperture in the disc. Further, the bimetallic disc of a valve of this type is mounted so that the peripheral portion thereof is movable in the cavity in the valve body when the disc is flexed in response to a predetermined temperature condition. More specifically, the disc is mounted so that when the central portion thereof is flexed toward the valve seat, the peripheral portion of the disc is free to move in a direction away from the plane of the valve seat and so that when the central portion of the disc is flexed away from the valve seat, the peripheral portion of the disc is free to move in a direction toward the plane of the valve seat. Further, the disc is mounted on a disc seat which is substantially coplanar with the valve seat so that when the valve is in the open position, fluid flowing through the valve causes the peripheral portion of the disc to be moved into engagement with the disc seat. Accordingly, when the valve is in the open position, the central portion of the disc is only spaced from the valve seat by the amount of curvature in the disc when it is in an inwardly flexed position.

In has been found that while valves of the above-described type are normally designed so that the aperture or apertures in the discs thereof function as flow restricting orifices, other resistances often limit the effectiveness of the apertures in the discs of valves of this type to accurately restrict fluid flows. More specifically, it has been found that substantial resistances can occur as a fluid passes between the one or more apertures in the disc of a valve of this type and the outlet passage of the valve due to the close tolerances between the central portion of the disc and the valve seat of the valve. In this regard, it should be recognized that when the disc of a valve of this type is in the open position, the central portion of the bimetallic disc is only spaced from the adjacent valve seat by the amount of curvature in the disc and that therefore the spacing between the central portion of the disc and the valve seat can be significantly less than the area of the one or more apertures in a bimetallic disc. Further, since the aperture or apertures in a bimetallic disc of a valve of this type must inherently be offset in nonaligned relation with respect to the adjacent valve seat, a fluid passing through the aperture or apertures must pass in close tolerances between the bimetallicdisc of the valve and the adjacent portion of the valve body before passing through the outlet passage. Accordingly, it has been found that significant resistances to fluid flow can occur in a valve of this type between the aperture or apertures in the bimetallic disc thereof and the outlet passage thereof. It has been further found that the amounts of these resistances can be unpredictable and that they can have serious detrimental effects on the accuracy with which the aperture or apertures in the bimetallic disc of a valve of this type can function for accurately restricting fluid flow.

The instant invention provides an effective thermostatic valve which is generally similar to the valve hereinabove set forth but which is operative with substantially increased accuracy for reducing the flow resistance through the valve when the valve is in the open position. Specifically, the valve of the instant invention comprises a valve body having an interior cavity formed therein and having first and second passages which communicate with the cavity and with the exterior of the valve body for passing fluids therebetween, a valve seat in the valve body at the inner end of the first passage, and a bimetallic disc mounted in the cavity adjacent the valve seat. The bimetallic disc has at least one aperture therethrough, and it is mounted and oriented so that it is responsive to a predetermined temperature condition for flexing between a closed position wherein the central portion of the disc engages the valve seat for preventing the flow of fluid therethrough, and an open position wherein the central portion of the disc is spaced from the valve seat so that fluid can flow between the first and second passages by passing through the aperture or apertures in the disc. The valve further comprises means for supporting the peripheral portion of the disc in inwardly spaced relation in the cavity from the plane of the valve seat in both the open and closed positions of the disc, and it preferably still further comprises means cooperating with the support means for maintaining the peripheral portion of the disc in a predetermined fixed position which is spaced inwardly in the cavity from the plane of the valve seat. The support means is preferably integrally formed with the bimetallic disc as either a peripheral rim or as a plurality of integrally formed feet which project toward the plane of the valve seat. The valve body is preferably further formed with a disc seat which extends in substantially coplanar relation around the valve seat, and the support means is preferably supported by the disc seat. Still further, in the preferred embodiment, the first passage in the valve body comprises an outlet passage, and the second passage comprises an inlet passage.

During use and operation of the valve of the subject invention, the bimetallic disc thereof is actuatable in response to a predetermined temperature condition for movement between open and closed positions, wherein the outlet passage is unobstructed and obstructed, respectively. However, because the support means supports the disc so that the peripheral portion thereof is maintained in inwardly spaced relation to the plane of the valve seat, an increased amount of spacing is provided between the central portion of the disc and the valve seat when the disc is in the open position. Hence, the resistance to the flow of a fluid passing between the aperture or apertures in the disc and the valve seat is substantially reduced. As a result, the aperture or apertures in the disc can effectively function for accurately restricting the flow of a fluid passing through the valve when the valve is in the open position.

Accordingly, it is a primary object of the instant invention to provide an improved bimetallic disc-actuated thermostatic valve.

Another object of the instant invention is to provide a thermostatic valve having an aperture in the bimetallic disc thereof which is effectively operative as an orifice for restricting the flow of a fluid through the valve when the valve is in an open position.

An even further object of the instant invention is to provide an effective bimetallic valve which is operative for accurately restricting the flow of a fluid therethrough when the valve is in the open position.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
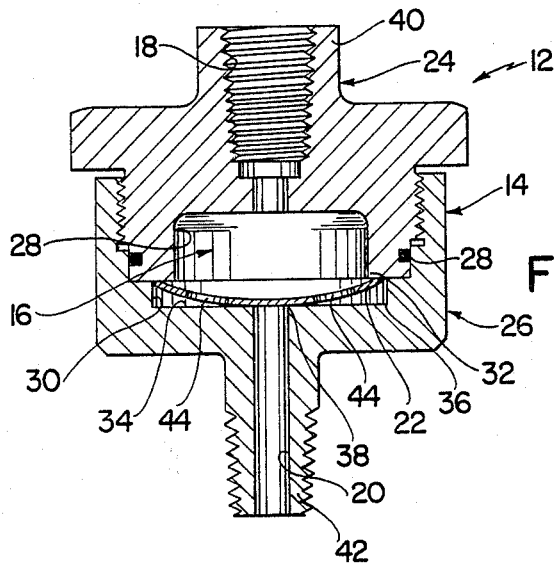
FIGS. 1 and 2 are sectional views of a valve of the prior art in closed and open positions thereof, respectively.
Figure 2:
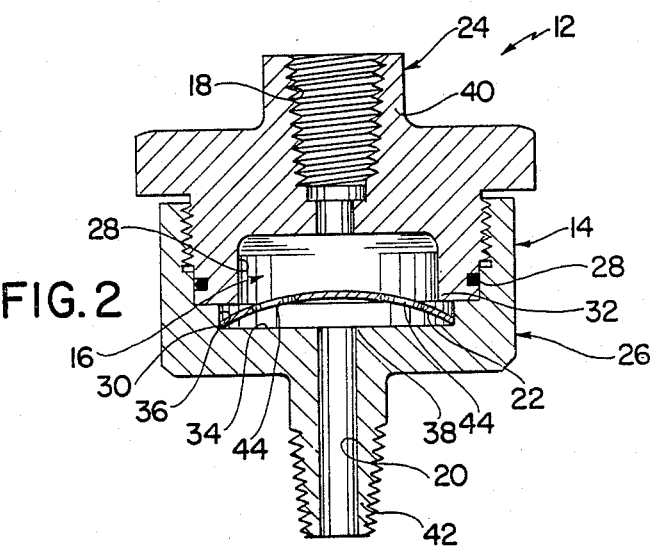
Figure 3:
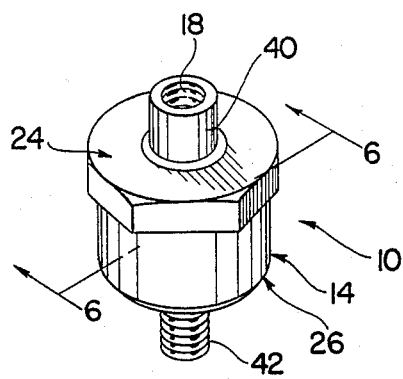
FIG. 3 is a perspective view of the valve of the instant invention.

Referring now to the drawings, the thermostatic valve of the instant invention is illustrated in FIGS. 3, 4, 6 and 7 and generally indicated at 10, and a valve of the prior art is illustrated in FIGS. 1 and 2, and generally indicated at 12. The valves 10 and 12 are generally similar in construction, and they are responsive to predetermined temperature conditions for movement between open and closed positions thereof. However, the valve 10 is operative for restricting the flow of a fluid therethrough with an increased degree of accuracy as compared to the valve 12, and hence the valve 10 represents a significant improvement over the valve 12 as will hereinafter be more fully set forth.

Referring first to FIGS. 1 and 2, the valve 12 of the prior art is illustrated. The valve 12 comprises a valve body generally indicated at 14 having an interior cavity 16 therein and inlet and outlet passages 18 and 20, respectively, which communicate with the cavity 16, and a bimetallic disc 22 in the cavity 16. The bimetallic disc 22 is responsive to a predetermined temperature condition for movement between the closed position thereof illustrated in FIG. 1, wherein it obstructs the inner end of the outlet passage 20 and the open position thereof illustrated in FIG. 2 wherein the central portion of the disc 22 is spaced inwardly from the inner end of the outlet passage 20.

The valve body 14 is preferably constructed from a suitable metal, such as brass, and it includes male and female valve body sections 24 and 26, respectively, which are received in threaded engagement so that they cooperate to define the cavity 16. An annular groove containing an O-ring 28 is provided in the male body section 24 so that it engages the interior of the female body section 26 to seal the cavity 16 when the male and female body sections 24 and 26, respectively, are in assembled relation. The cavity 16 includes first and second cavity sections 28 and 30, respectively, which are formed in the male and female body sections 24 and 26, respectively, so that they cooperate to define the cavity 16 when the male and female body sections 24 and 26 are in assembled relation. The first cavity section 28 is preferably of substantially circular configuration, and it is preferably coaxially aligned with the passage 18. The second cavity section 30 is preferably also of substantially circular configuration, and it is preferably coaxially aligned with both the first cavity section 28 and the outlet passage 20. Further, the second cavity section 30 preferably has a slightly greater diameter than the first cavity section 28 so that an interior shoulder 32 is formed in the body 14. The second cavity section 30 preferably has a substantially flat end wall 34 which defines both a disc seat 36 adjacent the outer periphery thereof and a valve seat 38 where the passage 20 extends through the end wall 34. A neck portion 40 is formed in the male body section 24, and the inlet passage 18 extends through the neck portion 40 and into the first cavity section 28. The interior of the outer portion of the inlet passage 18 is preferably formed in a tapered threaded configuration as illustrated. A threaded neck 42 which is slightly tapered in its outward extent is formed on the female body section 26, and the outlet passage 20 extends through the neck 42 and into the second cavity section 30.

The bimetallic disc 22 is preferably of substantially circular configuration, and it has a pair of apertures 44 therein which are outwardly offset from the center of the disc 22. The disc 22 is assembled in the valve 12 so that it is contained in the second cavity section 30 by the shoulder 32, and it is of slightly smaller diameter than the cavity section 30 so that it can flex freely therein.

During use and operation of the valve 12, the disc 22 is free to flex between the closed position thereof illustrated in FIG. 1 and the open position thereof illustrated in FIG. 2. In this regard, when the disc 22 is in the closed position thereof, the peripheral portion of the disc 22 is positioned adjacent the shoulder 32, whereas the central portion of the disc 22 is received in engagement with the valve seat 38 so that it obstructs the outlet passage 20. Further, since the apertures 40 are spaced outwardly from the center of the disc 22, they are positioned outwardly from the valve seat 38 when the disc 22 is in the closed position thereof so that fluids cannot pass through the apertures 44 to the outlet passage 20. When the disc 22 responds to a predetermined temperature change for flexing to the open position thereof illustrated in FIG. 2, the central portion of the disc 22 is flexed away from the valve seat 38 to enable fluids to pass through the apertures 44 and outwardly through the valve seat 38 and the outlet passage 20. However, since the peripheral portion of the disc 22 is not retained adjacent the shoulder 32, or otherwise supported in spaced relation from the plane of the end wall 34, the resistance of the fluid passing through the apertures 44 causes the disc to be moved to a position wherein the peripheral portion thereof is in engagement with the disc seat portion 36. As a result, even though a fluid can pass freely through the apertures 44, the fluid still must pass between the disc 22 and the end wall 34 to the valve seat 38 before it can pass outwardly through the passage 20. Further, due to the narrow spacing between the central portion of the disc 22 and the end wall 34, a substantial amount of resistance is applied to the fluid a it flows through the valve 12 even after it has passed through the apertures 44. As a result, the effectiveness of the apertures 44 to function as flow restricting orifices in the valve 12 is substantially diminished.

Referring now to FIGS. 3, 4, 6 and 7, the thermostatic valve 10 of the instant invention is illustrated. The valve 10 includes a body portion 14 having a cavity 16 therein and a bimetallic disc piece generally indicated at 46 which is mounted in the cavity 16, the disc piece 46 being responsive to a predetermined temperature condition for movement between the closed and open positions thereof illustrated in FIGS. 6 and 7, respectively. In comparison to the valve 12, the valve 10 is operative for restricting the flow of a fluid therethrough with an increased degree of accuracy and precision when the valve 10 is in the open position thereof.

The body 14 is substantially the same as the body 14 hereinabove described with respect to the valve 12, and it includes male and female body sections 24 and 26, respectively, which cooperate to define a cavity 16 having first and second cavity sections 28 and 30. The cavity 16 has a shoulder 32 where the cavity sections 28 and 30 meet, and the cavity section 30 has a substantially flat end wall 34 which defines a disc seat 36 and a valve seat 38. The male body section 24 includes a neck portion 40, and an inlet passage 18 extends inwardly through the neck portion 40 to the first cavity section 28. A neck portion 42 is formed on the female body section 26, and an outlet passage 20 extends from the cavity section 30 through the neck portion 42 to the exterior of the body 14.

Figure 4:
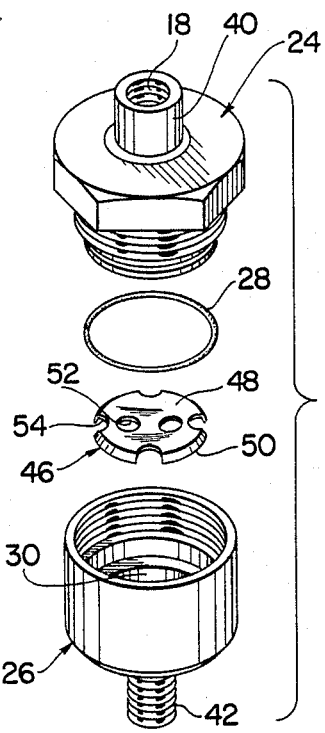
FIG. 4 is an exploded perspective view thereof.
Figure 6:
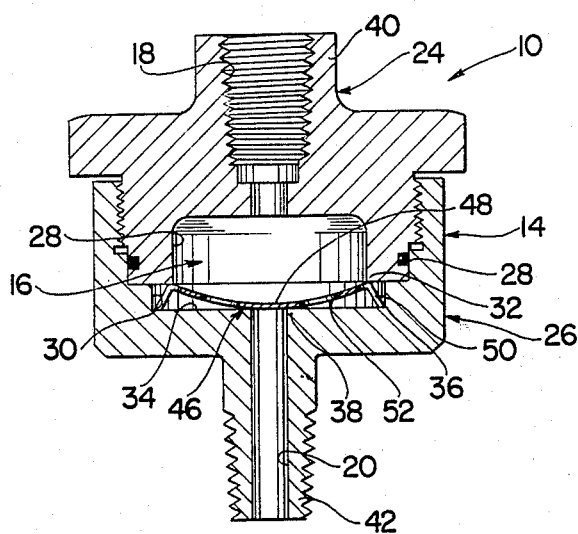
FIGS. 6 and 7 are sectional views of the valve of the instant invention in the closed and open positions thereof, respectively.
Figure 7:
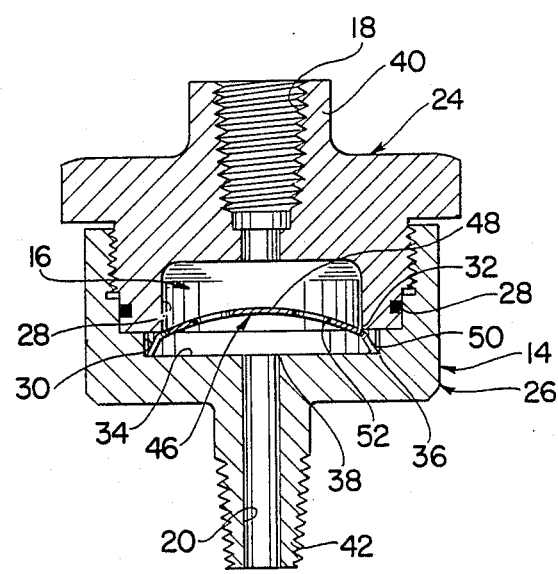

The bimetallic disc piece 46 is illustrated in FIGS. 4, 6 and 7, and it is constructed so that it is responsive to a predetermined temperature condition for movement between the closed and open positions illustrated in FIGS. 6 and 7, respectively. The disc piece 46 includes a substantially circular central disc portion 48, and a peripheral projection or rim portion 50. A pair of apertures 52 are formed in the central disc portion 48, and a plurality of notches 54 are formed in the peripheral portion of the disc portion 48. In this regard, the apertures 52 and the notches 54 are preferably formed with suitable degrees of precision to enable them to effectively function as flow orifices in the valve 10 for permitting the flow of a fluid therethrough. The rim portion 50 extends in substantially perpendicular relation from the disc portion 48, and it is formed in a segmented configuration as defined by the notches 54. The disc piece 46 is received in the second cavity section 30 of the valve 10, and it preferably has substantially the same diameter as the second cavity section 30. Further, the disc piece 46 is positioned so that the peripheral edges of the rim portion 50 rest on the disc seat portions 36 of the end wall 34 and so that the peripheral portions of the disc portion 48 are supported on the rim portion 50 in inwardly spaced relation in the cavity 16 from the end wall 34. Further, the disc piece 46 is preferably dimensioned so that the disc portion 48 thereof has a slightly greater diameter than the first cavity section 28 so that the peripheral edge of the disc portion 48 is engageable with the shoulder 32 to capture the disc piece 46 in the cavity section 30. Still further, the disc piece 46 is formed so that when it is assembled in the cavity section 30 and the disc piece 46 is in the closed position thereof, the apertures 52 are spaced outwardly from the valve seat 30 so that the central portion of the disc portion 48 fully obstructs the inner end of the outlet passage 20.

During use and operation of the valve 10, the disc piece 46 is responsive to a predetermined temperature condition for moving between the closed position illustrated in FIG. 6 and the open position illustrated in FIG. 7. In this regard, since the peripheral portion of the disc portion 48 is spaced inwardly from the end wall 34 by the rim portion 50, when the disc piece 46 is moved to the open position thereof, the peripheral portion of the disc portion 48 is not free to move outwardly toward the wall 34, and instead, the peripheral portion of the disc portion 48 is maintained in spaced relation to the end wall 34. Accordingly, when the disc piece 46 is in the open position thereof, the central portion of the disc portion 48 is spaced from the valve seat 38 and the end wall 34 by an increased amount so that the resistance to the flow of a fluid passing from the apertures 52 and the notches 54 to the outlet passage 20 is substantially reduced. As a result, the apertures 52 and the notches 54 can effectively function as flow restriction orifices since they produce substantially all of the fluid flow resistance through the valve 10 when the disc piece 46 is in the open position thereof. Hence, because the peripheral portion of the disc portion 48 is always maintained in inwardly spaced relation to the end wall 34, the valve 10 is operative for restricting the flow of a fluid therethrough with increased precision when the valve 10 is in the open position thereof.

Figure 5:
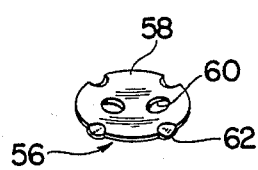
FIG. 5 is an alternate embodiment of the bimetallic disc of the valve.

An alternate embodiment of the bimetallic disc of the valve of the instant invention is illustrated in FIG. 5 and generally indicated at 56. The disc piece 56 includes a substantially circular disc portion 58 having a plurality of apertures 60 therein, and a plurality of projections or feet 62 which are integrally formed on the peripheral portion of the disc piece 56. The disc piece 56 is receivable in a valve body 14 so that the feet 62 rest on the disc seat portion 36 of the end wall 34 thereof and so that the shoulder 32 of the body 14 retains the disc piece 56 in the cavity section 30. The disc piece 56 is responsive to a predetermined temperature condition for flexing between open and closed positions thereof, and the feet 62 maintain the peripheral portion of the disc piece 56 in inwardly spaced relation in the cavity 16 from the end wall 34. Accordingly, a valve which is constructed with the bimetallic disc piece 56 is also operative with increased precision for restricting the flow of a fluid as it passes through the valve. Specifically, because the peripheral portion of the disc portion 58 is spaced inwardly by the feet 62, when the disc piece 56 is in the open position thereof, the central portion of the disc 58 is spaced inwardly from the end wall 34 by an increased amount. As a result, the resistance which is applied to a fluid passing from the apertures 60 to the adjacent outlet passage 20 is substantially reduced so that the apertures 60 can effectively function as flow restricting orifices which represent substantially the only frictional resistance in the valve.

It is seen, therefore, that the instant invention provides an effective improvement in a thermostatic valve. Specifically, since the peripheral portion of the bimetallic disc of the valve of the instant invention is spaced inwardly from the adjacent end wall, the frictional resistance applied to a fluid passing between the bimetallic disc and the outlet passage of the valve is substantially reduced. Accordingly, the main frictional resistance applied to a fluid passing through a valve constructed in accordance with the instant invention is applied by the bimetallic disc of the valve as the fluid passes through the apertures therein. As a result, the apertures are able to function as flow restricting orifices which can effectively control the flow of a fluid through the valve. Hence, it is seen that the valve of the subject invention represents a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a thermostatic valve of the type including a valve body having an interior cavity and having first and second passages therein which communicates with said cavity and with the exterior of said valve body for passing fluids therebetween, said valve body having a valve seat therein at the inner end of said first passage, a bimetallic disc in said cavity, said disc having an aperture therethrough and being mounted adjacent said valve seat, said disc being responsive to a predetermined temperature condition for movement between a closed position wherein the central portion of said disc is flexed toward said valve seat and substantially prevents the flow of fluid therethrough and an open position wherein the central portion of said disc is flexed away from said valve seat and wherein fluid can flow between said first and second passages by passing through said aperture, the improvement comprising projection means integrally formed on the peripheral portion of said bimetallic disc and projecting toward the plane of said valve seat for maintaining the peripheral portion of said disc in inwardly spaced relation in said cavity from the plane of said valve seat in both of said open and closed positions of said disc.

2. In the thermostatic valve of claim 1, said projection means comprising a plurality of integrally formed feet on the peripheral portion of said disc.

3. In the thermostatic valve of claim 1, said valve body having a disc seat formed in said cavity around said valve seat and in substantially coplanar relation therewith, said projection means being supported by said disc seat.

4. In the thermostatic valve of claim 1, said projection means comprising an integrally formed peripheral rim on said disc.

5. In the thermostatic valve of claim 1, said first passage further characterized as an outlet passage, said second passage further characterized as an inlet passage.

* * * * *